US011102204B1

(12) United States Patent
Jacques de Kadt et al.

(10) Patent No.: US 11,102,204 B1
(45) Date of Patent: Aug. 24, 2021

(54) AGREEMENT AND ENFORCEMENT OF RULES FOR A SHARED RESOURCE

(71) Applicant: Amazon Technologies, Inc., Seattle, WA (US)

(72) Inventors: Christopher Richard Jacques de Kadt, Seattle, WA (US); Richard Shawn Bice, Sammamish, WA (US); Allan Henry Vermeulen, Parksville (CA); Tate Andrew Certain, Seattle, WA (US); Anthony A. Virtuoso, Hawthorne, NJ (US); Philip Simko, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 16/216,520

(22) Filed: Dec. 11, 2018

(51) Int. Cl.
*H04L 29/06* (2006.01)
*H04L 9/08* (2006.01)
*H04L 12/24* (2006.01)
*H04L 9/30* (2006.01)
*H04L 12/927* (2013.01)
*H04L 12/28* (2006.01)
*H04L 12/66* (2006.01)
*G06F 15/16* (2006.01)
*H04L 9/32* (2006.01)

(52) U.S. Cl.
CPC ............. *H04L 63/10* (2013.01); *H04L 9/083* (2013.01); *H04L 9/30* (2013.01); *H04L 41/5019* (2013.01); *H04L 47/805* (2013.01); *H04L 63/08* (2013.01)

(58) Field of Classification Search
CPC . H04L 63/0435; H04L 9/0637; H04L 9/3236; G06F 21/53; G06F 21/57
See application file for complete search history.

(56) References Cited

U.S. PATENT DOCUMENTS

| 7,965,703 | B2  | 6/2011 | Rieger |
| 9,270,541 | B2  | 2/2016 | Burke et al. |
| 10,764,259 | B2 * | 9/2020 | Russinovich ........ G06Q 20/065 |

(Continued)

OTHER PUBLICATIONS

"Blockchain-Based E-Voting System"—Hjálmarsson et al, Reykjavik University, School of Computer Science, May 2018 https://skemman.is/bitstream/1946/31161/1/Research-Paper-BBEVS.pdf (Year: 2018).*

(Continued)

*Primary Examiner* — Randy A Scott
(74) *Attorney, Agent, or Firm* — Robert C. Kowert; Kowert, Hood, Munyon, Rankin & Goetzel, P.C.

(57) ABSTRACT

A shared resource service allows multiple clients to agree on rules for accessing a shared resource (e.g., a shared database or a shared service). The shared resource service also allows the clients to make changes to the rules (e.g., via consensus or majority vote). The clients use the shared resource service to enforce the rules, without having to trust each other to follow the rules when accessing the shared resource. First, the clients agree on a set of initial rules for accessing the shared resource and a set of initial rules for making changes to the rules. After the rules are initialized, then the clients can begin using the shared resource in accordance with the agreed upon rules. In response to a request for accessing the shared resource or a request for changing rules, the shared resource service enforce the applicable rules.

20 Claims, 9 Drawing Sheets

(56) References Cited

U.S. PATENT DOCUMENTS

2016/0119383 A1* 4/2016 Burke .................. H04L 47/805
                                                        726/1
2018/0191714 A1* 7/2018 Jentzsch .............. H04L 63/101
2019/0036887 A1* 1/2019 Miller ................ G06Q 20/4016

OTHER PUBLICATIONS

"Securing Bitcoin Wallets via a New DSA/ECDSA Threshold Signature Scheme"—Goldfeder, Princeton University, Aug. 2018 http://stevengoldfeder.com/papers/threshold_sigs.pdf (Year: 2018).*

* cited by examiner

AGREEMENT AND ENFORCEMENT OF RULES FOR A SHARED RESOURCE

BACKGROUND

A shared resource (e.g., a shared database or a shared service) can be highly valuable for a group of clients that uses the shared resource and relies on information consistency. In some cases, multiple clients who do not have a high-trust relationship among themselves may use a shared database to ensure that they all share a common view of the data. Typically, there are a set of rules that must be enforced in order for different parties to use a shared resource in a consistent manner. For example, a rule for a shared bank account database may not permit a client to randomly increment the value of a bank account or may not allow an account balance to go negative.

In a world where parties do not necessarily trust each other, difficulties may arise when using a shared resource because one party may break the rules of the system. Block chain technology is an example of a technique for sharing data among multiple parties that do not necessarily trust each other. Specifically, block chain technology uses a form of fault-tolerant consensus to enable participants in a system to vet changes before those changes are accepted. While block chain systems may be effective at mitigating various issues that arise when sharing data among multiple parties, they are typically heavy weight, lack agility, and come with significant performance penalties.

Figure 1:
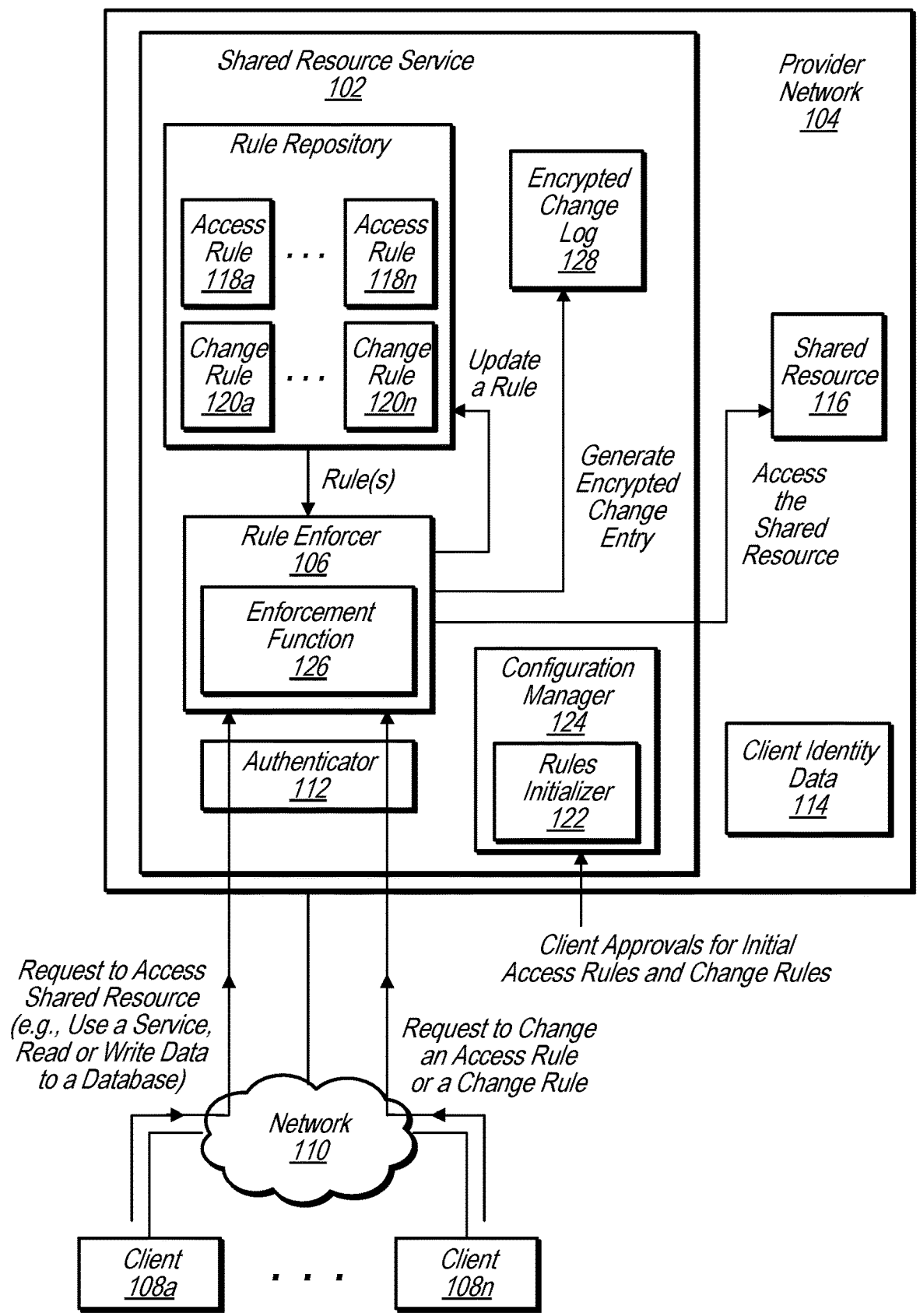
FIG. 1 illustrates a system for enforcing rules to share a resource among multiple clients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for agreement and enforcement of rules for a shared resource that is shared among multiple clients (e.g., multiple users, customers, or parties that access the resource). Embodiments may allow multiple clients to access a shared resource according to an agreed set of rules without the clients having to trust each other to properly adhere to the set of rules. To ensure that each client accesses the shared resource according to the set of rules, a shared resource service enforces the rules when a client provides a request for accessing the shared resource.

In various embodiments, "accessing" a shared resource may include using the shared resource. For example, a request to access a shared database may include a request to write data to the database or a request to read data from the database. As another example, a request to access a service may include a request to use the service (e.g., use functionality of the service to accomplish one or more tasks or to perform one or more operations). Thus, a request for accessing a shared resource may be a request to perform one or more operations using the shared resource (e.g., to change data of the resource, obtain data from the shared resource, perform one or more functions available at the shared service, etc.).

In some embodiments, a shared resource service of a provider network may perform various initialization steps in order to set up a resource (e.g., a database or other resource) to be shared among different clients. To do so, the shared resource service may first receive from clients an indication of a shared resource to be shared among the clients. The shared resource service may then receive from the clients a request to add and/or initialize access rules for accessing the shared resource (e.g., read and write permissions for a database table) and a request to add and/or initialize change rules for changing the access rules and/or the change rules (e.g., a threshold number of client approvals may be required for a proposed rule change to be made).

In various embodiments, the shared resource may be a part of the shared resource service, may be at another location of the provider network, or may be at a remote network. The indication of the shared resource may include any form of identification of the resource that may allow access to the resource and/or use of the resource (e.g., a network address, name, or other identifier). In embodiments, one or more clients may upload some or all of the resource to the shared resource service and/or the provider network (e.g., data, database tables, functions, code, etc.). In some embodiments, an external network address may be provided if the resource is located at a remote network.

In embodiments, a client may provide a request for accessing a shared resource (e.g., a request to write a value to a database table) and in response, the shared resource service enforces one or more access rules for accessing the shared resource. In some embodiments, the client may provide a request for changing the access rules or for changing change rules. As discussed below, the shared resource service may execute an enforcement function to enforce the applicable rules for accessing the shared resource or to enforce change rules for making changes to the access rules or the change rules.

As discussed below, in embodiments the shared resource service may authenticate client requests based on client credentials associated with the one or more requests (e.g., a client signature using a cryptographic technique, a password, and/or other security credentials). Therefore, the clients may have a mechanism for updating the rules of their system (e.g., the shared resource service) through a process that is cryptographically guaranteed. A client may trust the system itself to enforce the various rules, without having to trust any of the other clients that use the same shared resource.

In various embodiments, any suitable security communication protocols may be used to protect data that is being sent between any devices, resources, and/or networks (e.g., provider network, client network, shared resources, etc.). For example, data may be encrypted using SSL (secure socket layer), TLS (transport layer security), HTTPS (secure hypertext transfer protocol), and/or any other suitable network security protocol.

FIG. 1 illustrates a system for enforcing rules to share a resource among multiple clients, according to some embodiments. In the illustrative embodiment, a shared resource service 102 of a provider network 104 includes a rule enforcer 106 that receives requests from one or more clients 108.

In embodiments, a client 108 may be a user (e.g., a person, computing device, and/or software application of a remote client network) that sends requests to the shared resource service 102. Thus, in embodiments a client may be a person and/or a software application that submits requests to the shared resource service 102 via a device. A request may be transmitted to the rule enforcer 106 via a wide-area network 110 (e.g., the internet).

As shown, the shared resource service 102 includes an authenticator 112 that authenticates requests from clients based on client credentials associated with the requests (e.g., identity and/or security data included in the request). In embodiments, the client credentials may include any type of security credentials suitable for authenticating the request (e.g., verifying that the request was sent from the client), such as a client signature, password, or other data usable to verify authenticity.

In some embodiments, a portion (or all) of the request is encrypted using a private key of the client (e.g., to generate a client signature signed by the client using a private key unique to the client). In such cases, the shared resource service may decrypt the portion (or all) of the request using a public key (e.g., stored in the client identity data 114) that corresponds to the client's private key. As shown, the provider network and/or the shared resource service may store the client identity data 114 for each of the clients that use the shared resource service. Thus, the shared resource service may obtain any security credentials or other data associated with a particular client request in order to authenticate/verify the request came from the particular client (e.g., by comparing the obtained security credentials or other data to the client credentials associated with the client request).

In some embodiments, the authenticator and/or the shared resource service may also determine whether the client has permission to access a shared resource 116 associated with the request based on access rules 118 and/or the client identity data. Therefore, even though a client request may be authenticated, the request may still be denied if the access rules 118 and/or the client identity data indicate that the requesting client does not have permission for the requested access to the shared resource. For example, one or more particular clients may be allowed to write to certain tables or fields, but not to other tables or fields. As another example, one or more particular clients may be allowed to cause certain tasks or functions to be performed by a shared service, but those particular clients may not be allowed to cause other tasks or functions to be performed by the shared service.

In embodiments, any time that a request, approval, or other communication is received by the shared resource service from a client, the authenticator may authenticate the request/approval and accept or deny the request/approval based on client credentials associated with the request. Therefore, when the shared resource service receives a request/approval from a client, in embodiments it may be assumed that the request/approval is authenticated as described above and either denied or accepted (e.g., further processed by the shared resource service).

In the depicted embodiment, a rule repository may include any number of access rules 118 and any number of change rules 120. As shown, a rules initializer 122 of a configuration manager 124 may be used to add one or more initial access rules and/or one or more initial change rules to the rule repository. In some embodiments, the rule repository already includes one or more initial default access rules and/or one or more initial default change rules (e.g., provided by the provider network and/or the shared resource service).

In embodiments, to set up a shared resource to be shared among multiple clients, the configuration manager may receive, from one or more of the clients, an indication of a shared resource to be shared among the clients. For example, a client may send a request to the shared resource service that identifies the shared resource 116 to be shared among a certain number of clients. The request may identify the shared resource and each of the clients that are to share the resource (e.g., using identifiers for the resource and/or the clients). The shared resource service may then register the resource and/or the clients to share the shared resource 116 as users of the shared resource service.

The rules initializer 122 may then receive, from one or more of the clients, a request to add one or more access rules for accessing the shared resource by the clients and/or a request to add one or more change rules for changing the access rules and the change rules. For example, a particular client may request certain access rules and/or change rules to be added. The rules initializer may send, to some or all of the clients, an indication of the request to add the access rules and/or the request to add the change rules.

Subsequently, the rules initializer may receive, from a number of the clients, an authenticated approval of the request to add access rules and/or change rules, wherein the approvals are authenticated based on client credentials associated with the approvals. If the number of approvals received is at least a threshold number (and/or the threshold number of approvals were received within a threshold period of time after rules initializer sent the indications of the request to the clients), then the access rules and/or the change rules may be added to the rules repository for the clients to use the shared resource. If not, then the access rules and the change rules may not be added. In such cases, the client may need to re-send the request to add access rules and change rules.

In embodiments, the request to add one or more access rules and/or the request to add one or more change rules may itself include multiple authenticated client approvals that each corresponds to a different one of the plurality of clients. For example, the request may include multiple cryptographic signatures (e.g., signature encrypted using a private key unique to a client) that each corresponds to a different one of the plurality of clients. In such embodiments, the rules initializer may not need to send to the clients an indication of the request to add access rules or change rules. For example, if the rules initializer determines that the number of authenticated client approvals included in the request to add access rules and/or change rules is at least the threshold number, then the access rules and/or the change rules may be added to the rules repository for the clients to use the shared resource. Using the above techniques, some or all of the clients may agree on the initial access rules to be enforced for accessing the shared resource and/or the initial change rules to be enforced for changing the access rules and the change rules, as discussed below.

In some embodiments, in response to receiving a request from a client for accessing the shared resource (e.g., writing data to a database), the shared resource service executes an enforcement function 126 for the access rules to enforce the access rules. The service may allow or deny the request from the client based on the execution of the enforcement function. For example, the function may determine the access rules for the requested access to the shared resource. The function may determine, based on the access rules for the requested access, to allow the requested access (e.g., write permission for a database). In response to determining to allow the requested access, the function may perform one or more operations on the shared resource to implement the requested access (e.g., write data to the database). Thus, in embodiments, the function may not only determine whether the requested access is allowed, but it may also perform the requested access (e.g., the requested use of the shared resource). In some cases, the function may deny the requested access based on the access rules.

In embodiments, in response to receiving a request from a client to provide request parameters for accessing the shared resource (e.g., writing data to a database), a network address may be provided to the client (e.g., a uniform resource locator (URL)). The client may access the network address (e.g., using a web browser) and enter request parameters for accessing the shared resource (e.g., write request of certain data to a particular table or field). The client may then submit the request and in response to receiving the request, the shared resource service executes the enforcement function for the access rules to enforce the access rules, as described above.

In various embodiments, in response to a change of the shared resource (e.g., one or more operations that change the data of the shared resource) or a change in access rules or change rules, the enforcement function and/or the service may generate, using a public key of a public and private key pair, an encrypted entry of a change log 128 based on the change to the data (or the change to the rules). A private key of the public and private key pair may be inaccessible to the provider network and the private key may be stored at an independent verification service of a remote network. The service may send the change log (or at least the encrypted entry) to the independent verification service. For example, any number of entries of the change log may be sent on a periodic basis. At a subsequent time, the clients may then request the verification service to verify the changes made to the shared resource (or rules). The verification service may decrypt the entries and send the entries to the clients or send data to the clients that indicates at least some of the decrypted entries and/or order of the entries. This may allow clients to verify changes and/or the order of changes that were made to the shared resource or the rules.

In some embodiments, a symmetric key may be used instead of a public/private key as described above. For example, in response to a change of the shared resource (e.g., one or more operations that change the data of the shared resource) or a change in access rules or change rules, the enforcement function and/or the service may generate, using a symmetric key shared between the provider network and the independent verification service, an encrypted entry of a change log 128 based on the change to the data (or the change to the rules). The service may send the change log (or at least the encrypted entry) to the independent verification service.

In various embodiments, in response to a change of the shared resource (e.g., one or more operations that change the data of the shared resource) or a change in access rules or change rules, the enforcement function and/or the service may generate an entry of a change log 128 based on the change to the data (or the change to the rules). Thus, in embodiments, the entry of the change log may not be encrypted. The service may send the change log (or at least the encrypted entry) to the independent verification service and/or store the change log so that one or more clients may access and/or download entries of the change log. In some embodiments, the service may encrypt the change log (or at least the entry) before sending the change log to the independent verification service (e.g., using a public/private or a symmetric key, as described above).

In some embodiments, in response to receiving a request from a client for changing the access rules or the change rules (e.g., changing write permissions for a database or changing the required number of approvals to make a change to a particular access rule), the shared resource service executes an enforcement function 126 for the change rules to enforce the change rules. The service may allow or deny the request from the client based on the execution of the enforcement function. For example, the function may determine the change rules for the requested change to the access rules or the change rules. The function may determine, based on the determined change rules, whether to allow the requested change to the access rules or the change rules. In some cases, the function may deny the change based on the change rules. In response to determining to allow the requested change to the access rules or the change rules, the function may make the requested changes to the access rules or the change rules.

In embodiments, to determine the change rules for the requested change to the access rules or the change rules, the function may determine that the change rules for the requested change specify a threshold number of client approvals required to make the requested change to the access rules or the change rules. To determine whether to allow the requested change to the access rules or the change rules, the function may send, to some or all of the clients, an indication of the requested change to the access rules or the change rules.

Subsequently, the function may receive, from a number of the clients, an authenticated approval of the requested change to the access rules or the change rules. If the number of approvals received is at least a threshold number (and/or were received within a threshold period of time after the function sent the indications of the requested change), then the function may make the requested change to the access rules or the change rules. If the number of approvals received is not at least the threshold number or the number of approvals received within the threshold period of time is not at least the threshold number, then the change to the access rules or the change rules may by denied. In such cases, the client may need to re-send the change request to try again.

In various embodiments, the request from the client for changing the access rules or the change rules may itself include multiple authenticated client approvals that each corresponds to a different one of the plurality of clients. For example, the request may include multiple cryptographic signatures (e.g., signature encrypted using a private key unique to a client) that each corresponds to a different one of the plurality of clients. In such embodiments, the enforcement function may not need to send to the clients the indication of the requested change to the access rules or the change rules. For example, if the enforcement function determines that the number of authenticated client approvals included in the request is at least the threshold number, then the enforcement function may make the requested change to the access rules or the change rules without sending to the clients the indication of the requested change to the access rules or the change rules. However, if the number of authenticated client approvals included in the request is not at least the threshold number, then the enforcement function may still need to send to the clients the indication of the requested change to the access rules or the change rules (or at least send the indication to the clients that did not provide the authenticated approvals included in the request).

In embodiments, in response to receiving a request from a client to provide request parameters for changing the access rules or the change rules (e.g., changing write permissions for a database or changing the required number of approvals to make a change to a particular access rule), a network address may be provided to the client (e.g., a uniform resource locator (URL)). The client may access the network address (e.g., using a web browser) and enter request parameters for changing the access rules or the change rules (e.g., changing one or more of the access rules or change rules). The client may then submit the request and in response to receiving the request, the shared resource service executes the enforcement function for the change rules to enforce the change rules, as described above.

Using the above techniques, some or all of the clients may agree on changes (e.g., a majority). In embodiments, different change rules may specify different numbers (e.g., different thresholds) of approvals that are required to make changes to different access rules or change rules. For example, changes to a particular access rule may require at least 51% (or 51 out of 100) of clients to approve, whereas changes to another access rule may require at least 90% (or 90 out of 100) of clients to approve.

In some embodiments, if the change function receives a threshold number of disapprovals of the requested change (e.g., via an authenticated disapproval response), then the function may deny the requested change. In embodiments, the function may indicate to the requesting client (and any number of the other clients) that the requested change was denied.

Figure 2A:
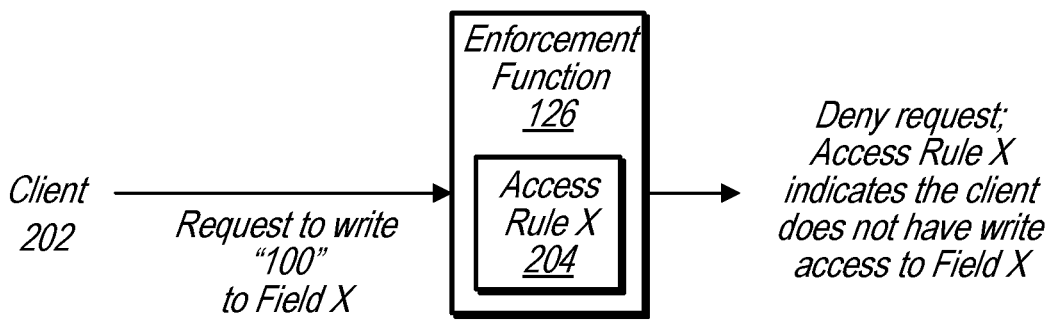
FIG. 2A illustrates an enforcement function that denies a client request to access a shared resource, according to some embodiments.

FIG. 2A illustrates an enforcement function that denies a client request to access a shared resource, according to some embodiments. In the depicted embodiment, a client 202 sends to the shared resource service 102 a request to access the data store 116. The requested access is to write the integer "100" to field X of a data structure of the data store (e.g., a field at a particular row and column of a table).

As shown, the shared resource service 102 executes an enforcement function to process the request to use the data store in accordance with access rule X 204. As shown, the function may determine, based on access rule X, that the client does not have write access to field X. In response, the function denies the request to use the shared data store (e.g., denies the write request).

Figure 2B:
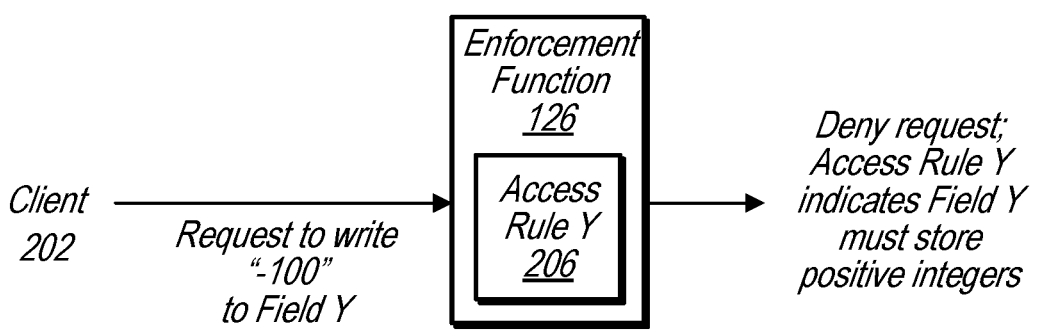
FIG. 2B illustrates an enforcement function that denies a client request to access a shared resource, according to some embodiments.

FIG. 2B illustrates an enforcement function that denies a client request to access a shared resource, according to some embodiments. In the depicted embodiment, a client 202 sends to the shared resource service 102 a request to write the integer "−100" to field Y of a data structure of the data store (e.g., another field at a particular row and column of a table).

As shown, the shared resource service 102 executes an enforcement function to process the request in accordance with access rule Y 206. The function may determine, based on access rule Y, that the client may not perform the write because access rule Y specifies that field Y must store only positive integers. In response, the function denies the request the write request.

Figure 2C:
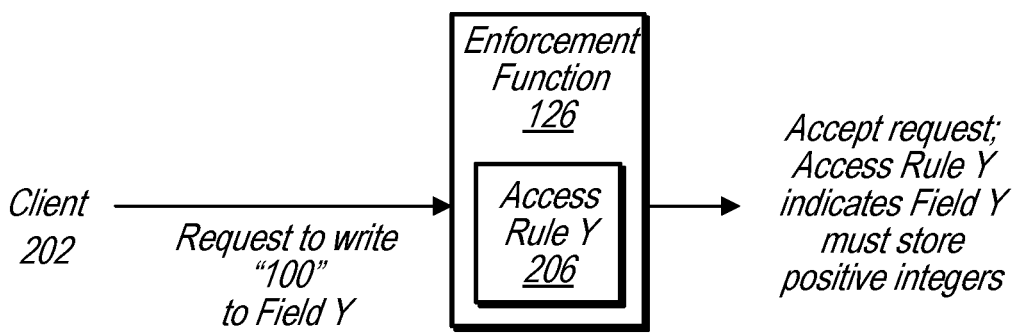
FIG. 2C illustrates an enforcement function that accepts a client request to access a shared resource and provides the requested access, according to some embodiments.

FIG. 2C illustrates an enforcement function that accepts a client request to access a shared resource and provides the requested access, according to some embodiments. In the depicted embodiment, a client 202 sends to the shared resource service 102 a request to write the integer "100" to field Y of a data structure of the data store (e.g., another field at a particular row and column of a table).

As shown, the shared resource service 102 executes an enforcement function to process the request in accordance with access rule Y 206. The function may determine, based on access rule Y, that the client may perform the write because access rule Y specifies that field Y must store only positive integers. In response, the function accepts the write request. The function may then perform a write operation to provide the requested access (e.g., writes "100" to field Y).

Figure 3A:
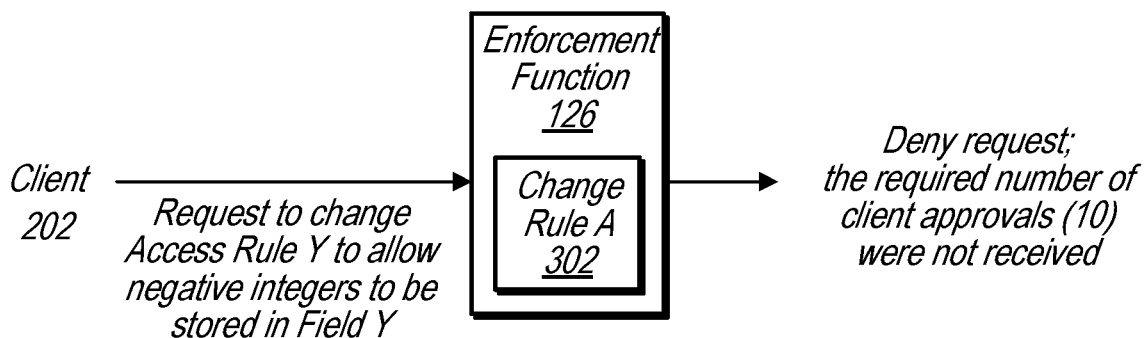
FIG. 3A illustrates an enforcement function that denies a client request to change an access rule, according to some embodiments.

FIG. 3A illustrates an enforcement function that denies a client request to change an access rule, according to some embodiments. In the depicted embodiment, a client 202 requests a change to access rule Y in order to allow negative integers to be stored in field Y.

As shown, the shared resource service 102 executes an enforcement function to process the request in accordance with change rule A 302. Change rule A may specify that at least 10 client approvals are required for the requested change to access rule Y. The function may determine that the required number of client approvals (e.g., 10) was not received (e.g., within a threshold period of time). Therefore, the function denies the request. For example, only 8 clients may have approved the change request within the period of time.

Figure 3B:
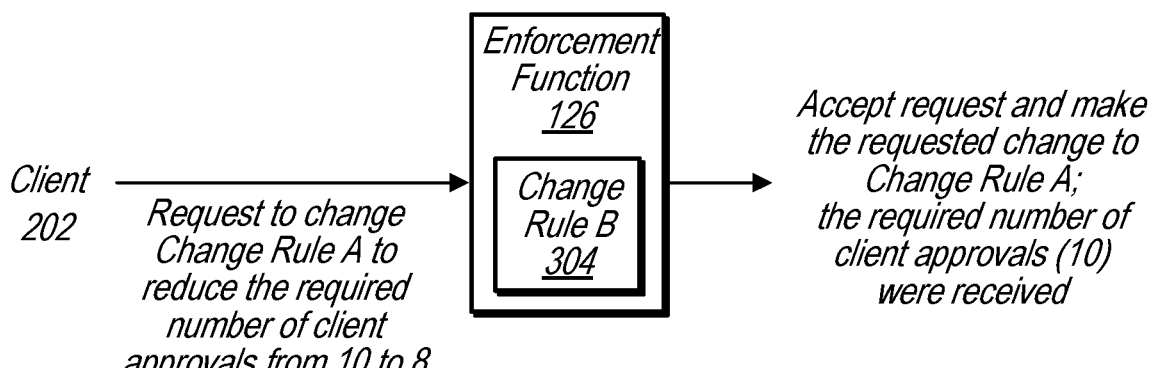
FIG. 3B illustrates an enforcement function that accepts a client request to change a change rule, according to some embodiments.

FIG. 3B illustrates an enforcement function that accepts a client request to change a change rule, according to some embodiments. In the depicted embodiment, a client 202 requests a change to change rule A to require only 8 or more clients to approve the requested change to access rule Y (instead of at least 10 clients).

As shown, the shared resource service 102 executes an enforcement function to process the request in accordance with change rule B 304. Change rule B may specify that at least 10 client approvals are required for the requested change to change rule B. The function may determine that the required number of client approvals (e.g., 10) were received (e.g., within a threshold period of time). Therefore, the function accepts the request and makes the requested change to change rule B (specify that only 8 or more clients to approve the requested change to access rule Y).

Figure 3C:
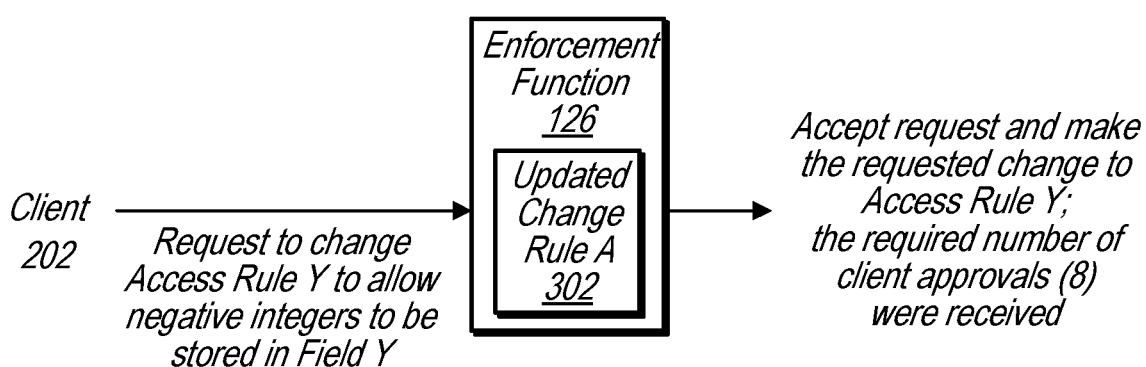
FIG. 3C illustrates an enforcement function that accepts a client request to change an access rule, according to some embodiments.

FIG. 3C illustrates an enforcement function that accepts a client request to change an access rule, according to some embodiments. In the depicted embodiment, a client 202 requests a change to access rule Y in order to allow negative integers to be stored in field Y.

As shown, the shared resource service 102 executes an enforcement function to process the request in accordance with the updated change rule A 302. The updated change rule A specifies that at least 8 client approvals are required for the requested change to access rule Y. The function may determine that the required number of client approvals (e.g., 8) were received (e.g., within a threshold period of time). Therefore, the function accepts the request and makes the requested change to access rule Y (e.g., access rule Y is changed to allow negative integers to be stored in field Y).

Figure 4:
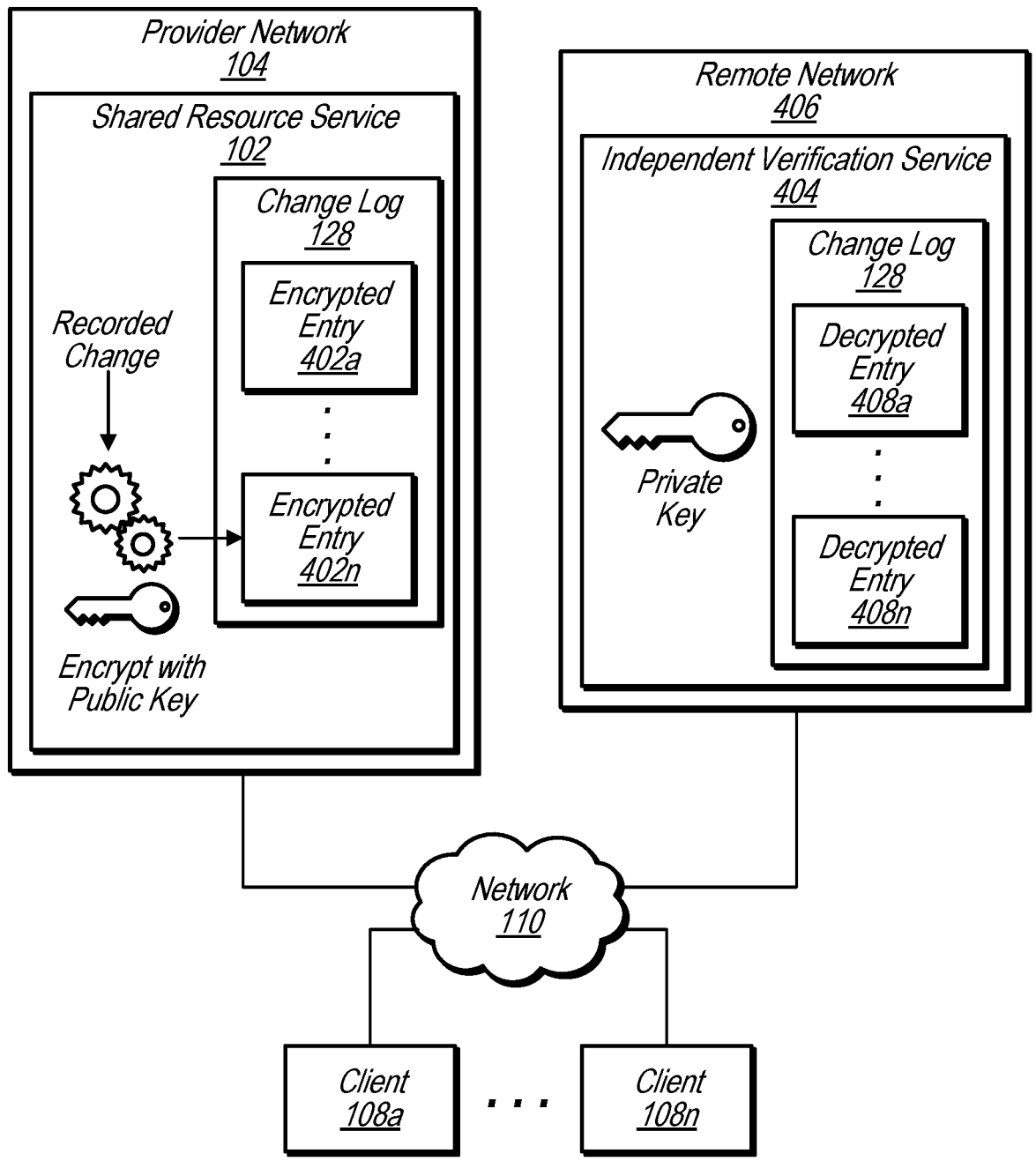
FIG. 4 illustrates a system for providing independent verification of changes made to a shared resource or changes made rules of a shared resource service, according to some embodiments.

FIG. 4 illustrates a system for providing independent verification of changes made to a shared resource or changes made rules of a shared resource service, according to some embodiments.

In the depicted embodiment, the shared resource service 102 stores a change log 128 of encrypted change entries 402 that correspond to changes made to a shared resource and/or changes made to access rules and change rules. In various embodiments, in response to a change of the shared resource (e.g., one or more operations that change the data of the shared resource) or a change in access rules or change rules, the enforcement function and/or the service may generate, using a public key of a public and private key pair, an encrypted entry of the change log 128 based on the change to the data (or the change to the rules). A private key of the public and private key pair may be inaccessible to the provider network and the private key may be stored at an independent verification service 404 of a remote network 406.

The shared resource service may send the change log (or any number of the encrypted entries) to the independent verification service (e.g., on a periodic basis or in response to a client request). At a subsequent time, the clients may then request the verification service to verify the changes made to the shared resource (or rules). The verification service may decrypt the entries and send the decrypted entries 408 to the clients or send data to the clients that indicates at least some of the decrypted entries and/or order of the entries. This may allow clients to verify changes and/or the order of changes that were made to the shared resource or the rules. For example, a client may send a request to the verification service for the entries or the data that indicates at least some of the decrypted entries and/or order of the entries. In response, the independent verification service 406 may send to the client the entries and/or the data. The response may include identification information that the client may use to verify the identity of the sender (e.g., the independent verification service 406).

In embodiments, the response may be signed with the private key of the independent verification service 406 and the client may verify/authenticate the response using the corresponding public key. This may allow a client to be confident that the entries were received from the independent verification service 406 and that the change entries provide an accurate record of changes (e.g., the change entries were not altered once they were encrypted).

Using one or more of the above techniques or similar techniques, the shared resource service may provide clients the ability to know that the rules of the use functions and/or the change functions were applied correctly (e.g., without violating any of the rules). For example, a hash-changed sequence of changes may be independently verified.

Figure 5:
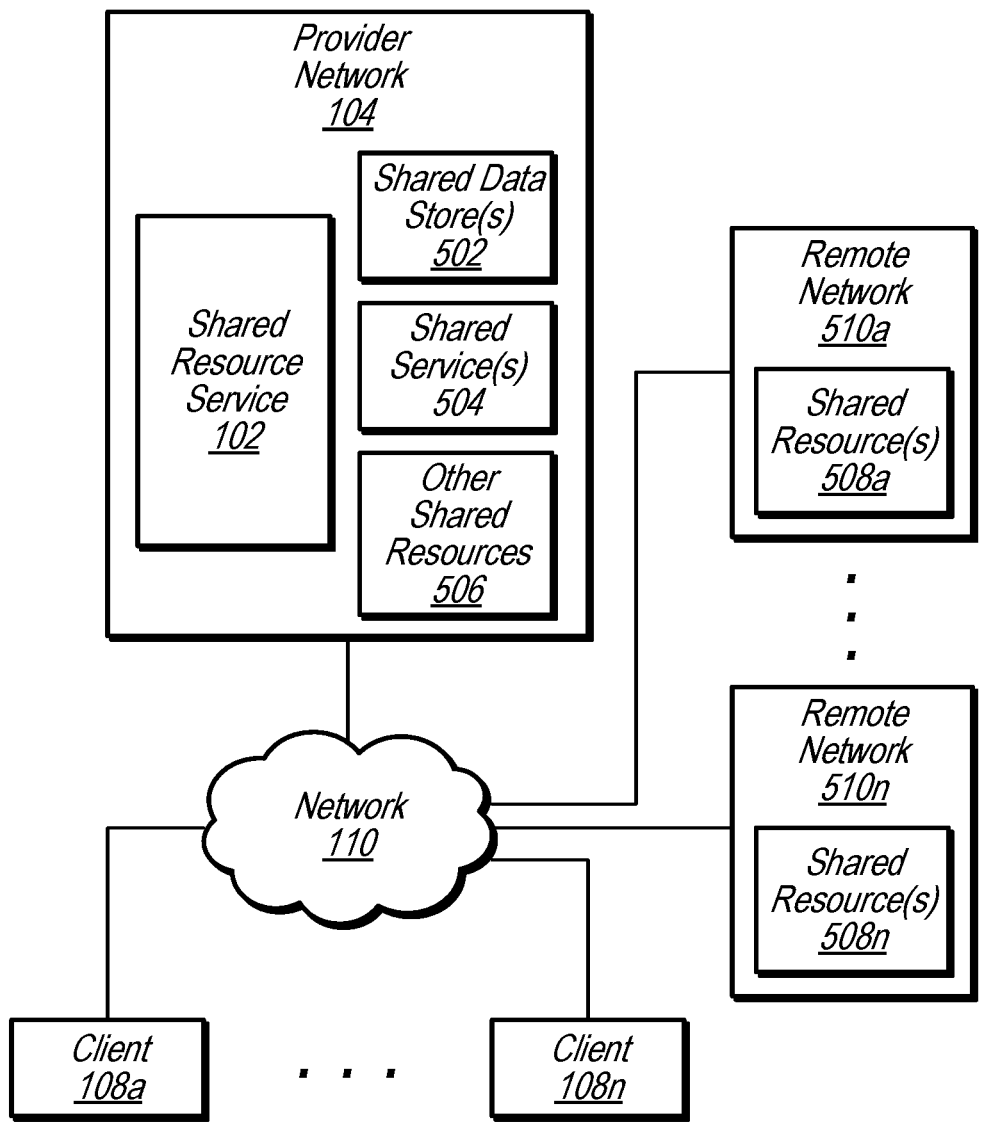
FIG. 5 illustrates a system for enforcing rules to share a resource among multiple clients, according to some embodiments.

FIG. 5 illustrates a system for enforcing rules to share a resource among multiple clients, according to some embodiments. The provider network 104 and the client networks 108 may be the same as or include one or more of the same components as the provider network 104 and the client networks 108 of FIG. 1. However, in the depicted embodiment, there are multiple resources that are available to be shared among one or more groups of clients. For example, a group of clients may share one or more data stores 502 (e.g., database), one or more services 504 (e.g., data object storage services, data streaming services, device services, machine learning services, data classification services, etc.), and/or one or more other resources 506 (e.g., hardware devices, hardware systems, etc.). In embodiments, one or more resources 508 of one or more remote networks 510 may be shared among a group of clients. Therefore, in embodiments, the shared resource service may manage access to shared resources that are located locally and/or remotely.

In embodiments, any of the shared resources of FIG. 5 may be shared in the same or similar manner as described for FIGS. 1-4. In some embodiments, a shared system of application programming interface (API) calls may be managed by a resource sharing service or a resource sharing system (e.g., behand an API gateway). Thus, some or all clients may be required to agree on how the APIs may be changed and those changes may be cryptographically guaranteed.

In some embodiments, billing for usage of the shared resource service may be apportioned among the participating clients (e.g., based on the amount of usage or requests from each client). For example, a client may be billed in proportion to the amount of time the service processes requests from the client or in proportion to the number of requests the client sends to the service. In embodiments, rules for how the shared resource service apportions billing among the participating clients may be encoded as billing rules and may be changeable using access rules or change rules, as discussed herein. Therefore, the clients may change how billing is calculated and assigned, based on agreement and/or consensus vote (e.g., majority vote or a threshold number of required approvals).

Figure 6:
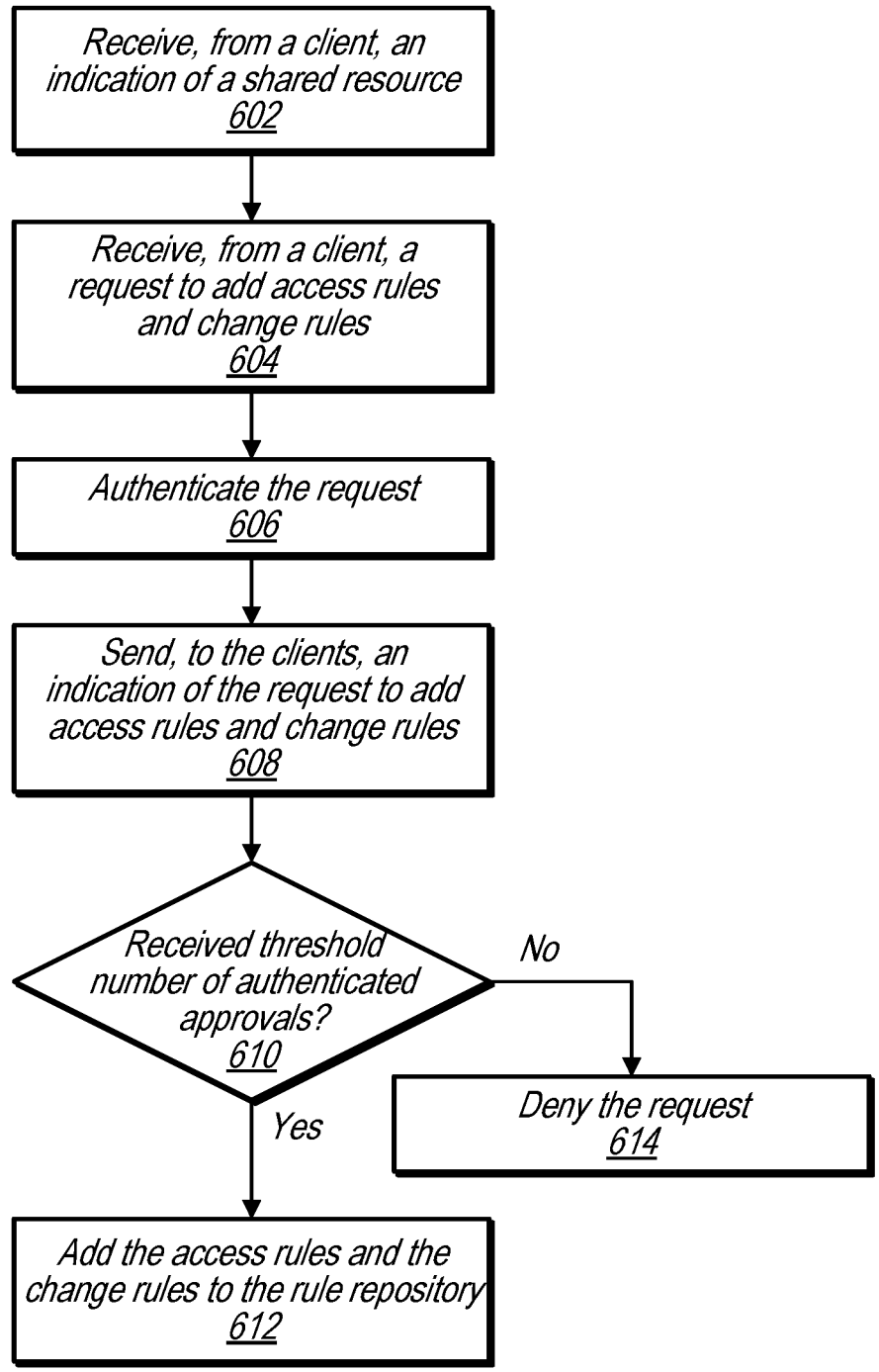
FIG. 6 is a flow diagram that illustrates initializing a shared resource service to share a resource among multiple clients, according to some embodiments.

FIG. 6 is a flow diagram that illustrates initializing a shared resource service to share a resource among multiple clients, according to some embodiments. At block 602, a shared resource service receives, from a client, an indication of a resource to be shared (e.g., a resource of the provider network or an external resource).

At block 604, the shared resource service receives, from a client, a request to add access rules and/or change rules to the shared resource service. As used herein, a request to add one or more access rules for accessing a shared resource by multiple clients may also be referred to as an "access rule request" and a request to add one or more change rules for changing the access rules or the change rules may also be referred to as a "change rule request." Therefore, in embodiments, the shared resource service may receive, from one or more of the clients, an access rule request to add one or more access rules for accessing the shared resource by the clients and/or a change rule request to add one or more change rules for changing the access rules and the change rules.

At block 606, the shared resource service authenticates the request. In embodiments, the shared resource service may authenticate the access rule request and/or the change rule request based on client credentials associated with the access rule request or the change rule request. At block 608, the shared resource service sends, to some or all of the clients, an indication of the request to add access rules and/or change rules. Thus, in embodiments, the shared resource service may send, to some or all of the clients, an indication of the access rule request and/or the change rule request.

At block 610, the shared resource service determines whether a threshold number of authenticated approvals are received (e.g., within a threshold period of time). If so, then at block 612, the shared resource service adds the access rules and/or the change rules to the rule repository. The shared resource service may then begin processing requests from the clients to access the shared resource and/or to change access rules or change rules.

In embodiments, the shared resource service may receive the threshold number of authenticated approvals as separate authenticated response messages from each of the clients. In some embodiments, the shared resource service may receive the threshold number of authenticated approvals in one or more messages that each may include multiple authenticated approvals. For example, a particular client may send a message to the shared resource service that includes two or more authenticated approvals of the request from two or more different clients (e.g., appended to the message). At block 610, if the shared resource service determines that the threshold number of authenticated approvals were not received (e.g., within the threshold period of time), then at block 614, the shared resource service denies the request.

Figure 7:
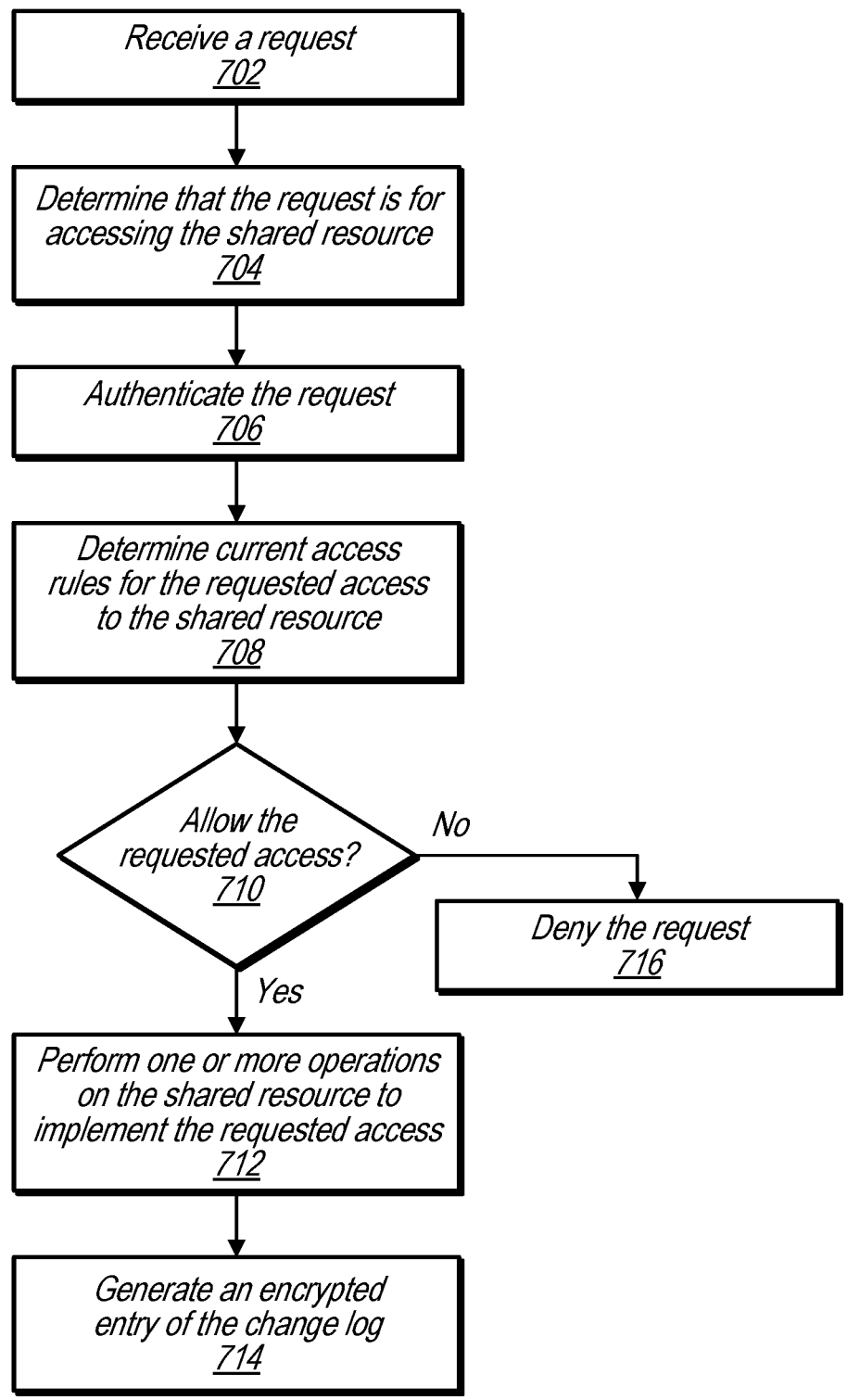
FIG. 7 is a flow diagram that illustrates processing a client request for accessing a shared resource, according to some embodiments.

FIG. 7 is a flow diagram that illustrates processing a client request for accessing a shared resource, according to some embodiments. At block 702, the shared resource service receives a request from a client. At block 704, the shared resource service determines the request is for accessing a shared resource.

At block 706, the shared resource service authenticates the request. At block 708, the shared resource service determines the current access rules for the requested access to the shared resource. At block 710, the shared resource service determines whether to allow the requested access, based on the current access rules. If so, then at block 712, the shared resource service performs one or more operations on the shared resource to implement the requested access (e.g., write data or read data). At block 714, the shared resource service generates an encrypted log entry for a change log. Returning to block 710, if the shared resource service determines not to allow the requested access based on the current access rules, then at block 716, the shared resource service denies the request.

Figure 8:
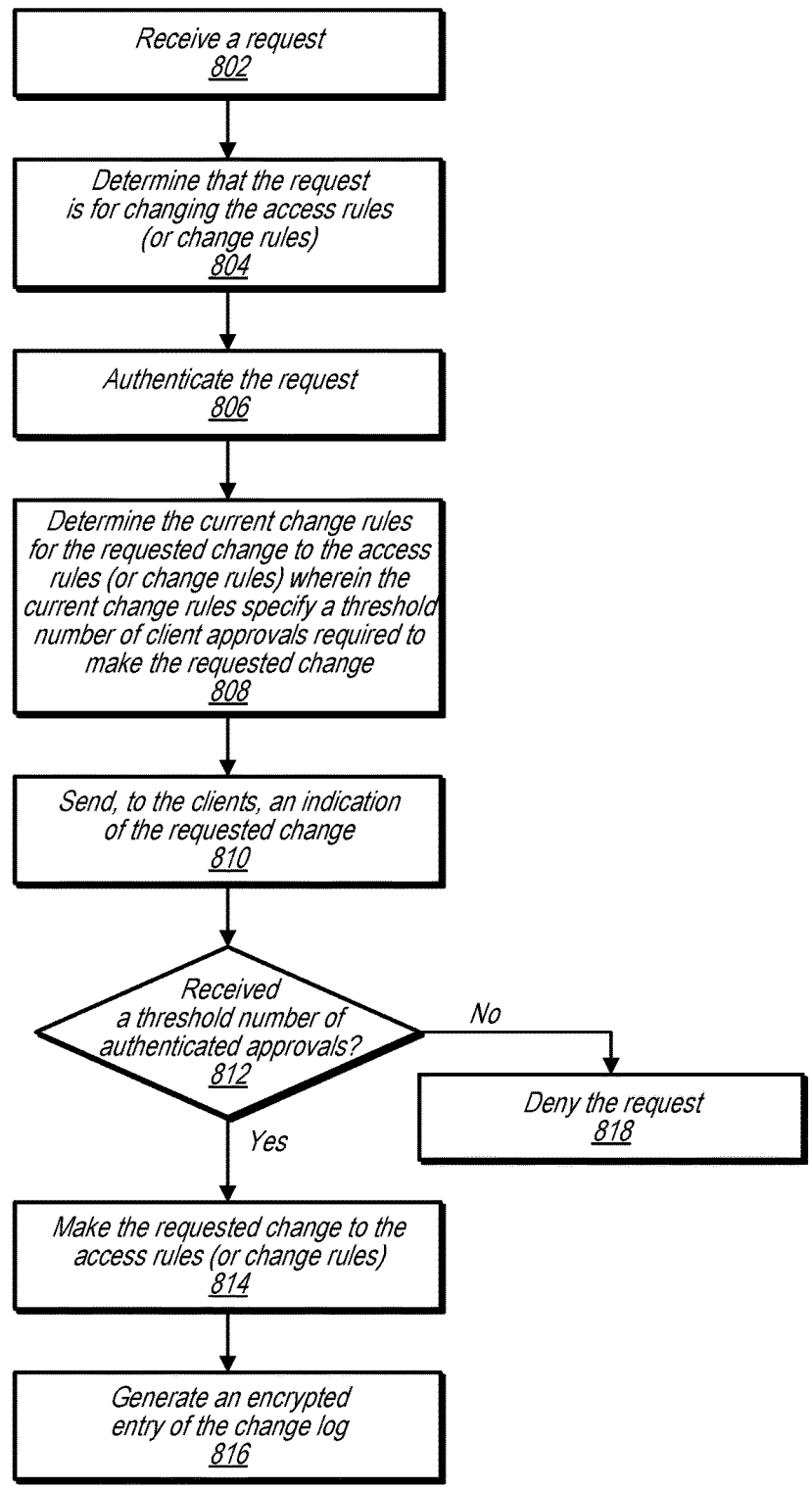
FIG. 8 is a flow diagram that illustrates processing a client request for changing access rules or change rules, according to some embodiments.

FIG. 8 is a flow diagram that illustrates processing a client request for changing access rules or change rules, according to some embodiments. At block 802, the shared resource service receives a request from a client. At block 804, the shared resource service determines the request is for changing the access rules or change rules.

At block 806, the shared resource service authenticates the request. At block 808, the shared resource service determines the current access rules for the requested change, wherein the current rules specify a threshold number of client approvals required to make the requested change. At block 810, the shared resource service sends to some or all of the clients an indication of the requested change.

At block 812, the shared resource service determines whether the threshold number of authenticated approvals of the requested change are received (e.g., within a threshold period of time). As described above, the shared resource service may receive the threshold number of authenticated approvals as separate authenticated response messages from each of the clients, or as one or more messages that each may include multiple authenticated approvals. If the threshold number of authenticated approvals is received, then at block 814, the shared resource service makes the requested change to the access rules or the change rules. The shared resource service may then being processing requests from the clients in accordance with the updated access rules or updated change rules. At block 816, the shared resource service generates an encrypted log entry for a change log. Returning to block 812, if the shared resource service determines that the threshold number of authenticated approvals were not received (e.g., within the threshold period of time), then at block 818, the shared resource service denies the request.

Any of various computer systems may be configured to implement processes associated with the provider network, remote networks, shared resource service, shared resources, verification service, or any component of the above figures. For example, FIG. 9 is a block diagram illustrating an example computer system that implements some or all of the techniques described herein, according to some embodiments.

Figure 9:
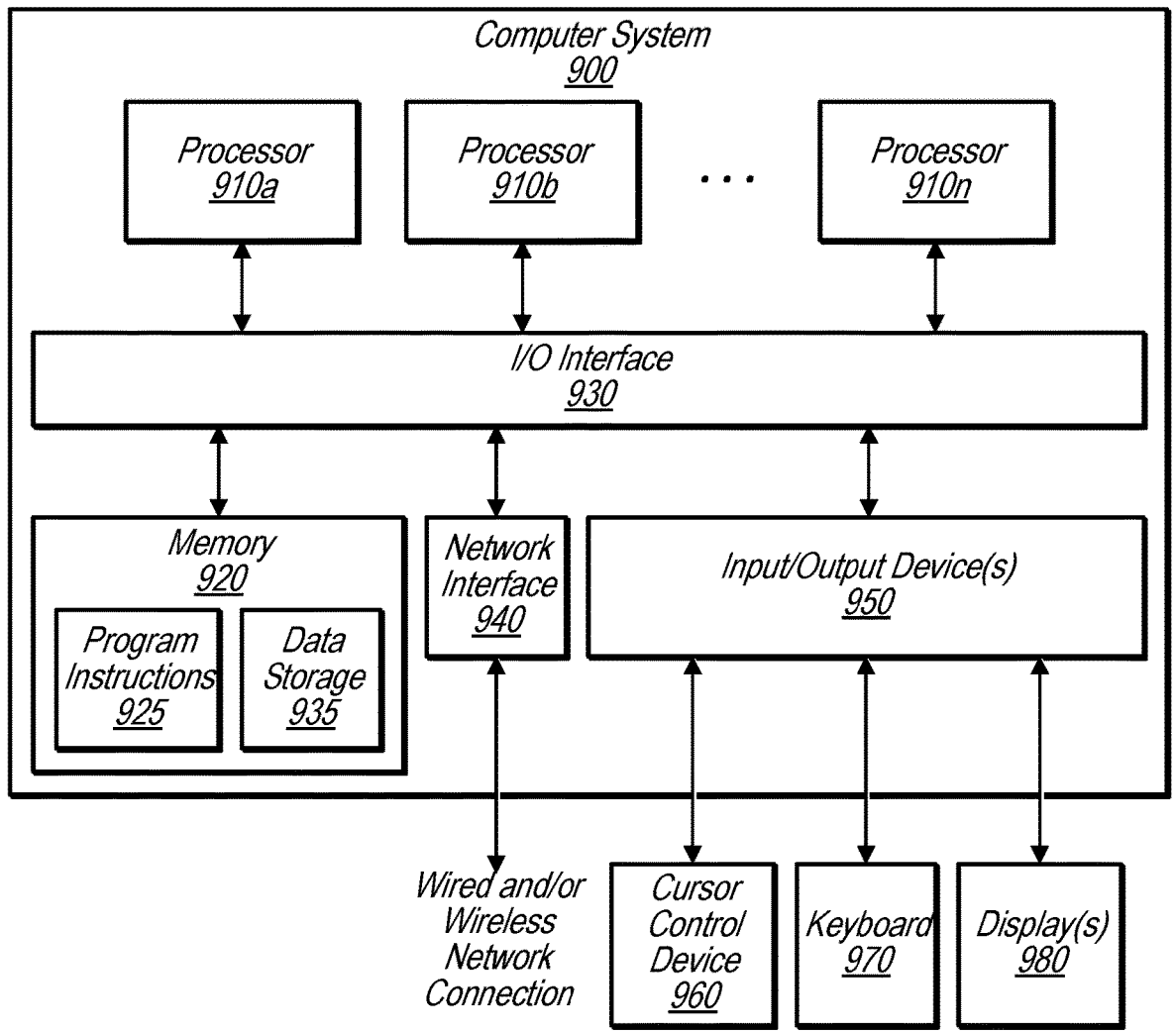
FIG. 9 is a block diagram illustrating an example computer system that implements some or all of the techniques described herein, according to some embodiments.

In various embodiments, the provider network, remote networks, shared resource service, shared resources, verification service, or any other component of any of FIGS. 1-8 may each include one or more computer systems 900 such as that illustrated in FIG. 9. In embodiments, the provider network, remote networks, shared resource service, shared resources, verification service, or any other component may include one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 920 as program instructions 925. In some embodiments, system memory 920 may include data 935 which may be configured as described herein.

In one embodiment, I/O interface 1930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 1940 may be configured to allow data to be exchanged between computer system 900 and other computer systems 900 or devices attached to a network, such as the local network discussed above, a wide-area network, or a local network within the provider network, for example. In particular, network interface 940 may be configured to allow communication between computer system 900 and/or various I/O devices 950. I/O devices 950 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In some embodiments, I/O devices 950 may be relatively simple or "thin" client devices. For example, I/O devices 950 may be configured as dumb terminals with display, data entry and communications capabilities, but otherwise little computational functionality. However, in some embodiments, I/O devices 950 may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices 950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device 950 (e.g., cursor control device 960, keyboard 970, or display(s) 980 may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the shared resource service, shared resources, various services or devices of the provider networks, remote networks, clients/client networks, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network comprising respective processors and memory to implement a shared resource service for a plurality of clients to:
- receive, from a client of the plurality of clients of the shared resource service, an indication of a shared resource to be shared among the plurality of clients;
- receive, from one or more of the plurality of clients, an access rule request to add, to the shared resource service, one or more access rules that indicate whether to allow requests from one or more of the plurality of clients for accessing the shared resource or a change rule request to add, to the shared resource service, one or more change rules that indicate whether to allow requests from one or more of the plurality of clients for changing the access rules or the change rules;
- authenticate the access rule request or the change rule request based on client credentials associated with the access rule request or the change rule request;
- send, to the plurality of clients, an indication of the access rule request or the change rule request;
- receive, from at least a threshold number of the plurality of clients, an authenticated approval of the access rule request or the change rule request, wherein approvals are authenticated based on client credentials associated with the approvals;
- in response to a determination that the threshold number of approvals were received, add the one or more access rules or the one or more change rules to a rule repository; and
- in response to a request for accessing the shared resource, enforce at least one of the access rules, or
- in response to a request for changing the access rules or the change rules, enforce at least one of the change rules.

2. The system as recited in claim 1, wherein to enforce at least one of the access rules or at least one of the change rules, the one or more computing devices are configured to implement the shared resource service to:
- execute an enforcement function for the access rules or the change rules based on the request for accessing the shared resource or the request for changing the access rules or the change rules; and
- allow or deny the request for accessing the shared resource or the request for changing the access rules or the change rules based on the execution of the enforcement function.

3. The system as recited in claim 2, wherein to execute the enforcement function for the access rules, the one or more computing devices are configured to implement the shared resource service to:
- authenticate the request for accessing the shared resource based on client credentials associated with the request;
- determine access rules for the requested access to the shared resource;
- determine, based on the access rules for the requested access, to allow the requested access; and
- in response to the determination to allow the requested access, perform one or more operations on the shared resource to implement the requested access.

4. The system as recited in claim 3, wherein the one or more operations change data stored by the shared resource, and wherein the one or more computing devices are configured to implement the shared resource service to:
- generate, using a public key of a public and private key pair, an encrypted entry of a change log based on the change to the data, wherein a private key of the public and private key pair is inaccessible to the provider network and is stored at an independent verification service of a remote network; and
- send at least the encrypted entry of the change log to the independent verification service of the remote network.

5. The system as recited in claim 2, wherein to execute the enforcement function for the change rules, the one or more computing devices are configured to implement the shared resource service to:
- authenticate the request for changing the access rules based on client credentials associated with the request;
- determine change rules for the requested change to the access rules, wherein the determined change rules specify a threshold number of client approvals required to make the requested change to the access rules;
- send, to the plurality of clients, an indication of the requested change to the access rules;
- receive, from at least the threshold number of the plurality of clients, an authenticated approval of the requested change to the access rules, wherein the approvals of the requested change to the access rules are authenticated based on client credentials associated with the approvals; and
- in response to a determination that the threshold number of approvals of the requested change to the access rules were received, make the requested change to the access rules of the rule repository.

6. A method, comprising:
- receiving, from one or more of a plurality of clients of a shared resource service of a provider network, a request to add, to the shared resource service, one or more access rules that indicate whether to allow requests from one or more of the plurality of clients for accessing a shared resource;
- authenticating the request based on client credentials associated with the request;
- sending, to the plurality of clients, an indication of the request to add one or more access rules;
- receiving, from at least a threshold number of the plurality of clients, an authenticated approval of the request to add one or more access rules, wherein the approvals are authenticated based on client credentials associated with the approvals;
- in response to a determination that the threshold number of approvals were received, adding the access rules to a rule repository; and
- enforcing access to the shared resource according to the access rules.

7. The method as recited in claim 6, wherein enforcing access to the shared resource according to the access rules comprises:
- in response to receiving a request for accessing the shared resource, executing an enforcement function for the access rules based on the request for accessing the shared resource; and
- allowing or denying the request for accessing the shared resource based on the execution of the enforcement function.

8. The method as recited in claim 7, wherein executing the enforcement function for the access rules comprises:
- authenticating the request for accessing the shared resource based on client credentials associated with the request;

determining access rules for the requested access to the shared resource;

determining, based on the access rules for the requested access, to allow the requested access; and in response to the determination to allow the requested access, performing one or more operations on the shared resource to implement the requested access.

9. The method as recited in claim 8, wherein the one or more operations change data stored by the shared resource, and further comprising:

generating at a provider network, using a symmetric key shared between the provider network and an independent verification service, an encrypted entry of a change log based on the change to the data; and sending at least the encrypted entry of the change log to the independent verification service of the remote network.

10. The method as recited in claim 6, further comprising:

in response to receiving a request for changing the access rules or the change rules, wherein the request for changing the access rules or the change rules comprises a plurality of cryptographic signatures that each corresponds to a different one of the plurality of clients, executing an enforcement function for change rules based on the request for changing the access rules or the change rules, the executing comprising:

authenticating the request for changing the access rules or the change rules based on client credentials associated with the request;

determining the change rules for the requested change to the access rules or the change rules, wherein the determined change rules specify a threshold number of client approvals required to make the requested change to the access rules;

in response to determining that a number of the cryptographic signatures of the request for changing the access rules or the change rules is at least the threshold number, making the requested change to update at least one of the access rules or at least one of the change rules of the rule repository.

11. The method as recited in claim 10, wherein enforcing access to the shared resource according to the access rules comprises:

in response to receiving a request for accessing the shared resource, executing an enforcement function for the access rules based on the request for accessing the shared resource, the executing comprising:

authenticating the request for accessing the shared resource based on client credentials associated with the request;

determining the at least one updated access rule for the requested access to the shared resource;

determining, based on the at least one updated access rule for the requested access, to allow the requested access; and in response to the determination to allow the requested access, performing one or more operations on the shared resource to implement the requested access.

12. The method as recited in claim 10, wherein different ones of the change rules specify different threshold numbers of client approvals required to make different changes to the access rules.

13. The method as recited in claim 6, wherein the shared resource comprises a shared database, a shared service, a shared application, or a shared computing system.

14. One or more non-transitory computer-accessible storage media storing program instructions that when executed on or across one or more processors:

receive, from one or more of a plurality of clients of a shared resource service of a provider network, a request to add, to the shared resource service, one or more change rules that indicate whether to allow requests from one or more of the plurality of clients for changing access rules that indicate whether to allow requests from one or more of the plurality of clients for accessing a shared resource or for changing the change rules;

authenticate the request based on client credentials associated with the request;

send, to the plurality of clients, an indication of the request to add one or more change rules;

receive, from at least a threshold number of the plurality of clients, an authenticated approval of the request to add one or more change rules, wherein the approvals are authenticated based on client credentials associated with the approvals;

in response to a determination that the threshold number of approvals were received, add the change rules to a rule repository; and in response to a request for changing the access rules or the change rules, enforce at least one of the change rules.

15. The one or more storage media as recited in claim 14, wherein to enforce access to the shared resource according to the access rules, the program instructions when executed on or across the one or more processors:

in response to receiving a request for accessing the shared resource, execute an enforcement function for the access rules based on the request for accessing the shared resource; and allow or deny the request for accessing the shared resource based on the execution of the enforcement function.

16. The one or more storage media as recited in claim 15, wherein to execute the enforcement function for the access rules, the program instructions when executed on or across the one or more processors:

authenticate the request for accessing the shared resource based on client credentials associated with the request;

determine access rules for the requested access to the shared resource;

determine, based on the access rules for the requested access, to allow the requested access; and in response to the determination to allow the requested access, perform one or more operations on the shared resource to implement the requested access.

17. The one or more storage media as recited in claim 14, wherein to enforce at least one of the change rules, the program instructions when executed on or across the one or more processors:

execute an enforcement function to:

authenticate the request for changing the access rules or the change rules based on client credentials associated with the request;

determine change rules for the requested change to the access rules or the change rules, wherein the determined change rules specify a threshold number of client approvals required to make the requested change to the access rules;

send, to the plurality of clients, an indication of the requested change to the access rules or the change rules;

receive, from at least the threshold number of the plurality of clients, an authenticated approval of the requested change to the access rules or the change rules, wherein the approvals of the requested change are authenticated based on client credentials associated with the approvals; and in response to a determination that the threshold number of approvals of the requested change to the access rules or the change rules were received, make the requested change to update at least one of the access rules or at least one of the change rules of the rule repository.

18. The one or more storage media as recited in claim 17, wherein the one or more operations change data stored by the shared resource, and wherein the program instructions when executed on or across the one or more processors:

generate at a provider network an entry of a change log based on the update to the at least one of the access rules or at least one of the change rules.

19. The one or more storage media as recited in claim 17, wherein the program instructions when executed on or across the one or more processors:

in response to another request for changing the access rules or the change rules, execute an enforcement function to:

authenticate the other request for changing the access rules or the change rules based on client credentials associated with the other request;

determine the at least one updated change rule for the other requested change to the access rules or the change rules, wherein the at least one updated change rule specifies a different threshold number of client approvals required to make the other requested change;

send, to the plurality of clients, an indication of the other requested change to the access rules or the change rules;

receive, from at least the different threshold number of the plurality of clients, an authenticated approval of the other requested change to the access rules or the change rules, wherein the approvals of the other requested change are authenticated based on client credentials associated with the approvals; and in response to a determination that the different threshold number of approvals of the other requested change to the access rules or the change rules were received, make the other requested change to update at least one of the access rules or at least one of the change rules of the rule repository.

20. The one or more storage media as recited in claim 14, wherein at least a portion of the request is encrypted using a private key, and wherein to authenticate the request based on client credentials associated with the request, the program instructions when executed on or across the one or more processors:

decrypt at least the portion of the request using a public key that corresponds to the private key.

* * * * *